(No Model.)
P. DICKMAN.
RUB IRON FOR WAGONS.
No. 273,041. Patented Feb. 27, 1883.
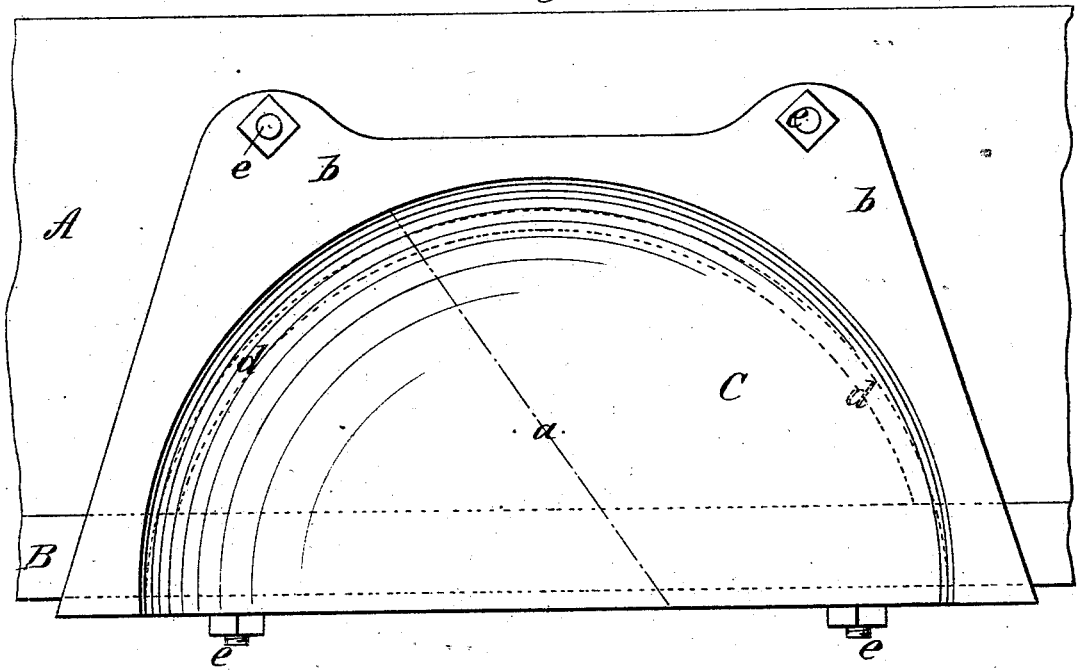
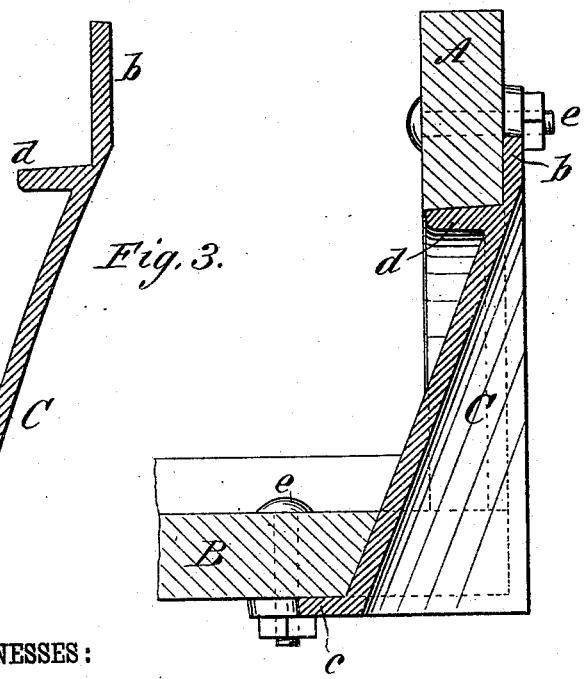
WITNESSES:
Donn Twitchell
C. Sedgwick
INVENTOR:
P. Dickman
BY Munn & Co
ATTORNEYS.

UNITED STATES PATENT OFFICE.

PETER DICKMAN, OF DEFIANCE, OHIO.

RUB-IRON FOR WAGONS.

SPECIFICATION forming part of Letters Patent No. 273,041, dated February 27, 1883.

Application filed October 14, 1882. (No model.)

*To all whom it may concern:*

Be it known that I, PETER DICKMAN, of Defiance, in the county of Defiance and State of Ohio, have invented a new and useful Improvement in Rub-Irons for Wagons, of which the following is a full, clear, and exact description.

The object of my invention is to provide a rub-iron of durable and substantial character and one that shall not lock the wheels.

To that end my invention consists in a concave iron provided with ribs and flanges for retaining it in place, as hereinafter described and claimed.

Reference is to be had to the accompanying drawings, forming part of this specification, in which similar letters of reference indicate corresponding parts in all the figures.

Figure 1 is a face view of the iron as applied to a wagon-box. Fig. 2 is a cross-section of the same, and Fig. 3 is a section on the line $a$.

A is the side board, and B is the bottom board of the wagon-box.

C is the rub-iron. In general form the body of the iron is that of one-half of a concave circular disk, the arc of the concave being about that of the forward wheels, so that the wheels shall touch the iron its whole width, as illustrated by the line $a$. The iron is formed on its sides with flanges $b$, and on its lower edge with a flange, $c$, for taking beneath the bottom board. At the rear side and near the base of the flange $b$ it is formed with a simicircular rib, $d$.

To apply the iron, the side board, A, is cut out to receive the iron and the semicircular disk $d$, and the bottom board is recessed to the concave form of the lower edge of the iron. Bolts $e$ are passed through the side and bottom boards and through the flanges $b$ $c$. The ends of the ribs $d$ rest, as shown, upon the bottom board, B, so as to prevent the iron from dropping down. By means of these flanges and the ribs the iron is held against strain in all directions, so that the bolts are relieved from the strain and serve simply to hold the iron to the wood. The wide extent of surface which the iron presents to the wheel insures durability and light wear, and the iron being of nearly the same form as the wheel on its wearing-surface there is no possibility of the wheels locking.

Having thus described my invention, I claim as new and desire to secure by Letters Patent—

1. A rub-iron for wagons, formed with the apertured side flanges, $b c$, and the semicircular rib $d$, whereby it may be applied to the wagon sides and bottom, as described.

2. A rub-iron for wagons, having its concavity in the arc of a circle corresponding to that of the wheel, and receiving the rim of wheel, as shown at $a$ in Fig. 1 of the drawings, whereby the wheel-rim will contact with all parts of the arc, as described.

PETER DICKMAN.

Witnesses:
EMANUEL N. GEARING,
FRANKLIN EDINY,
WILLIAM FURTHMILLER.